United States Patent
Kiger

(10) Patent No.: US 9,450,216 B2
(45) Date of Patent: Sep. 20, 2016

(54) INTRINSICALLY SAFE BATTERY PACK

(75) Inventor: William B. Kiger, Hoschton, GA (US)

(73) Assignee: MOTOROLA SOLUTIONS, INC., Schaumburg, IL (US)

(*) Notice: Subject to any disclaimer, the term of this patent is extended or adjusted under 35 U.S.C. 154(b) by 982 days.

(21) Appl. No.: 13/586,139

(22) Filed: Aug. 15, 2012

(65) Prior Publication Data

US 2014/0050945 A1    Feb. 20, 2014

(51) Int. Cl.
*H01M 2/04*    (2006.01)
*H01M 2/10*    (2006.01)
*H01M 10/42*    (2006.01)

(52) U.S. Cl.
CPC ......... *H01M 2/0413* (2013.01); *H01M 2/1016* (2013.01); *H01M 2/1094* (2013.01); *H01M 10/425* (2013.01); *Y10T 29/49108* (2015.01)

(58) Field of Classification Search
None
See application file for complete search history.

(56) References Cited

U.S. PATENT DOCUMENTS

| | | |
|---|---|---|
| 7,248,021 B2 | 7/2007 | Kozu et al. |
| 7,759,001 B2 | 7/2010 | Kozu et al. |
| 2003/0170530 A1 | 9/2003 | Nishimura et al. |
| 2010/0173185 A1 | 7/2010 | Norgaard et al. |

FOREIGN PATENT DOCUMENTS

| | | |
|---|---|---|
| EP | 1895610 A1 | 5/2008 |
| GB | 2393569 A | 3/2004 |

OTHER PUBLICATIONS

PCT International Search Report dale mailed Dec. 3, 2013 corresponding to PCT/US2013/054615.

*Primary Examiner* — Tracy Dove
(74) *Attorney, Agent, or Firm* — Barbara R. Doutre

(57) ABSTRACT

An intrinsically safe battery pack assembly (200) is formed by disposing electrical components (208) on a single side of a printed circuit board (PCB) (210) and coating the component side of the PCB with a low pressure molded encapsulation (220). The bottom surface of the PCB provides interface contacts for a charger and radio. The LPM encapsulation is formed over the top side of the PCB to cover the electrical components at a predetermined height set to be at the height of the tallest component. The top surface of the PCB having the electrical components and LPM encapsulation (220) is oriented to face the plurality of battery cells within the battery pack (200).

20 Claims, 4 Drawing Sheets

INTRINSICALLY SAFE BATTERY PACK

FIELD OF THE DISCLOSURE

The present disclosure relates generally to battery packs and more particularly to an assembly for an intrinsically safe battery pack.

BACKGROUND

Portable public safety radios are utilized in a variety of environmental and hazardous conditions, and battery packs are typically used to power such radios. Under certain environmental conditions there exists the possibility of a spark being generated when the battery pack is removed or replaced from the radio. Accidental occurrences of short circuits or soft shorts of external battery contacts may be sufficient to create hot spots with the potential to cause sparking problems in the field. It is imperative to avoid any sparking between the device and the battery that might result in an explosion and/or a fire.

Product safety directives have been established under various agencies and standards, such as Factory Mutual (FM) and ATmosphere EXplosible (ATEX) and IECEx to address product safety. Devices operating under these directives or standards are also referred to as intrinsically safe devices.

FIG. 1 shows a prior art shows a partial cut-away view of an intrinsically safe battery pack assembly 100. The prior art battery pack 100 is shown in a cross sectional side view 102, a first perspective view 104, and a second perspective view 106. In side cross sectional side view 102, a plurality of charging and radio interface components 108 are shown disposed upon a printed circuit board (PCB) 110. A pair of spacers 112 are disposed beneath the PCB 110 and coupled to a PCB insulator 114. Beneath the PCB insulator 114 are a plurality of battery cells 116, shown in two stacks. The cell stacks may or may not be staggered. Additional spacers 118 are situated between pairs of vertically stacked cells. A flex insulator 120 covers the last pair of battery cells 116.

Perspective view 104 shows the flex insulator 120 as well as various charging and radio contacts 122. In this view, it can be seen that additional components 124 are located on an opposing side of the PCB 110. The PCB 110 thus extends outward of the cell stacks. In order to accommodate components 124, the cells 116 must be staggered (as shown in view 106), increasing the overall size of the battery pack 100. Additionally, in order to interconnect the PCB components 108, 124 to the charging and radio contacts 122 requires the use of a connector 124 mounted to the PCB. The connector 124 is covered by a portion of the flex 120. Hence, in the case of intrinsically safe battery packs for public safety devices, the battery packs tend to be large and bulky in order to accommodate all of the layered elements and components needed to meet both the power and safety requirements.

When developing an intrinsically safe electronic device for today's portable communication device market, a designer must provide a safe device while addressing the challenges of parts count, board space and ease of manufacturability. Particularly in the case of battery packs for public safety radios, the ability to decrease the overall size, weight, and cost of the battery pack would be highly advantageous.

Accordingly, it would be highly desirable to have an improved battery pack that ensures product safety using few components, taking up little board space and facilitating manufacturing.

BRIEF DESCRIPTION OF THE FIGURES

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

Figure 1:
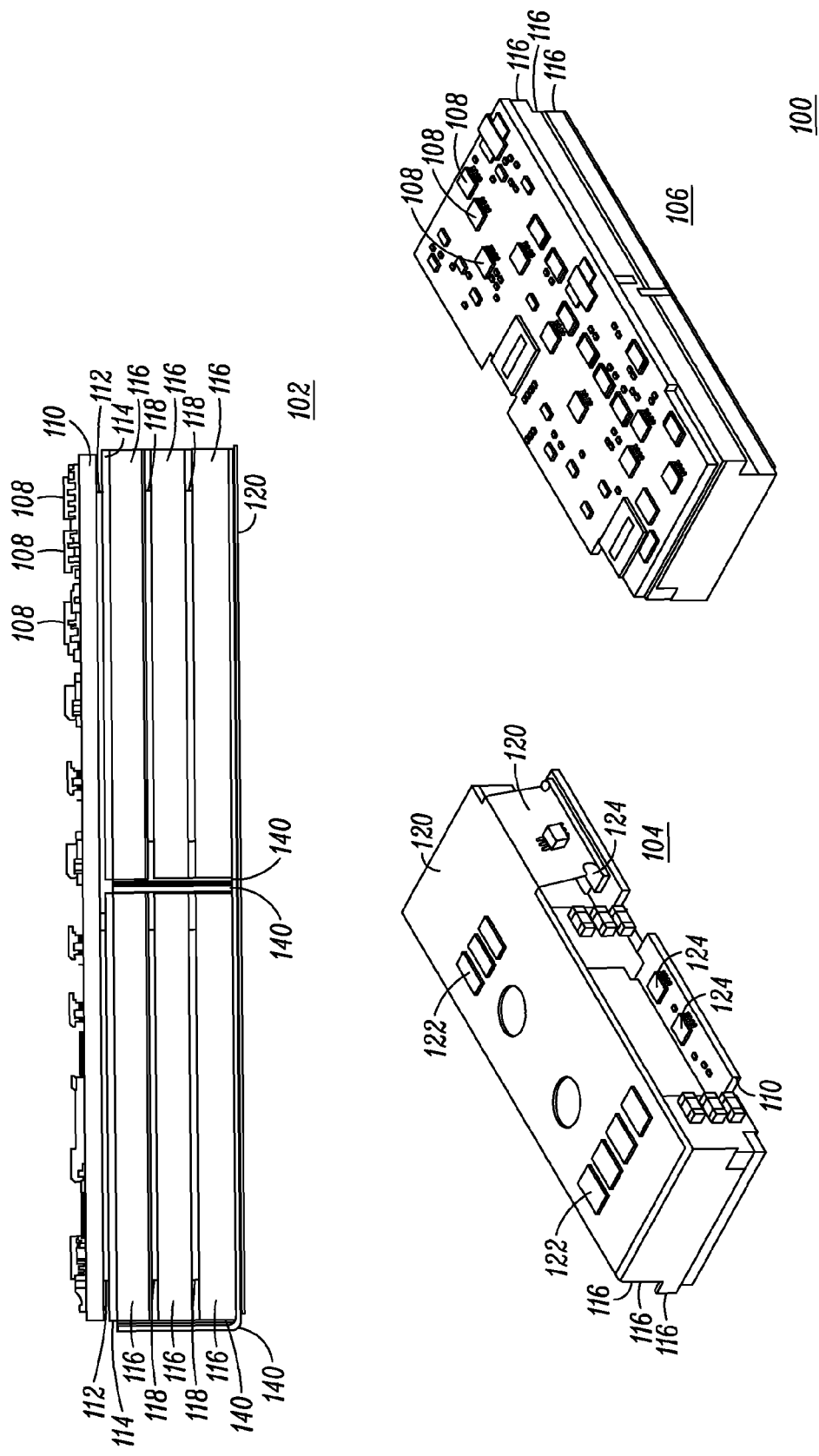
FIG. 1 illustrates various views of a battery pack in accordance with the prior art.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

The apparatus and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION

Briefly there is described herein, a low profile intrinsically safe battery pack formed in accordance with an embodiment. The battery pack is assembled using a low pressure mold encapsulation formed over a component side of a printed circuit board thereby enabling the component side of the PCB to be oriented inward towards the cells of the pack. The battery pack can thus be stacked in a substantially planar, non-staggered manner. Charger and radio contacts are disposed on the non-component side of the PCB. The battery pack formed in accordance with the embodiment, eliminates several layers associated with the prior art pack including, an insulator, a flex, and a connector. The overall thickness of the battery pack formed in accordance with the embodiment is completely optimized without additional thickness for insulation while still maintaining agency requirements.

Figure 2:
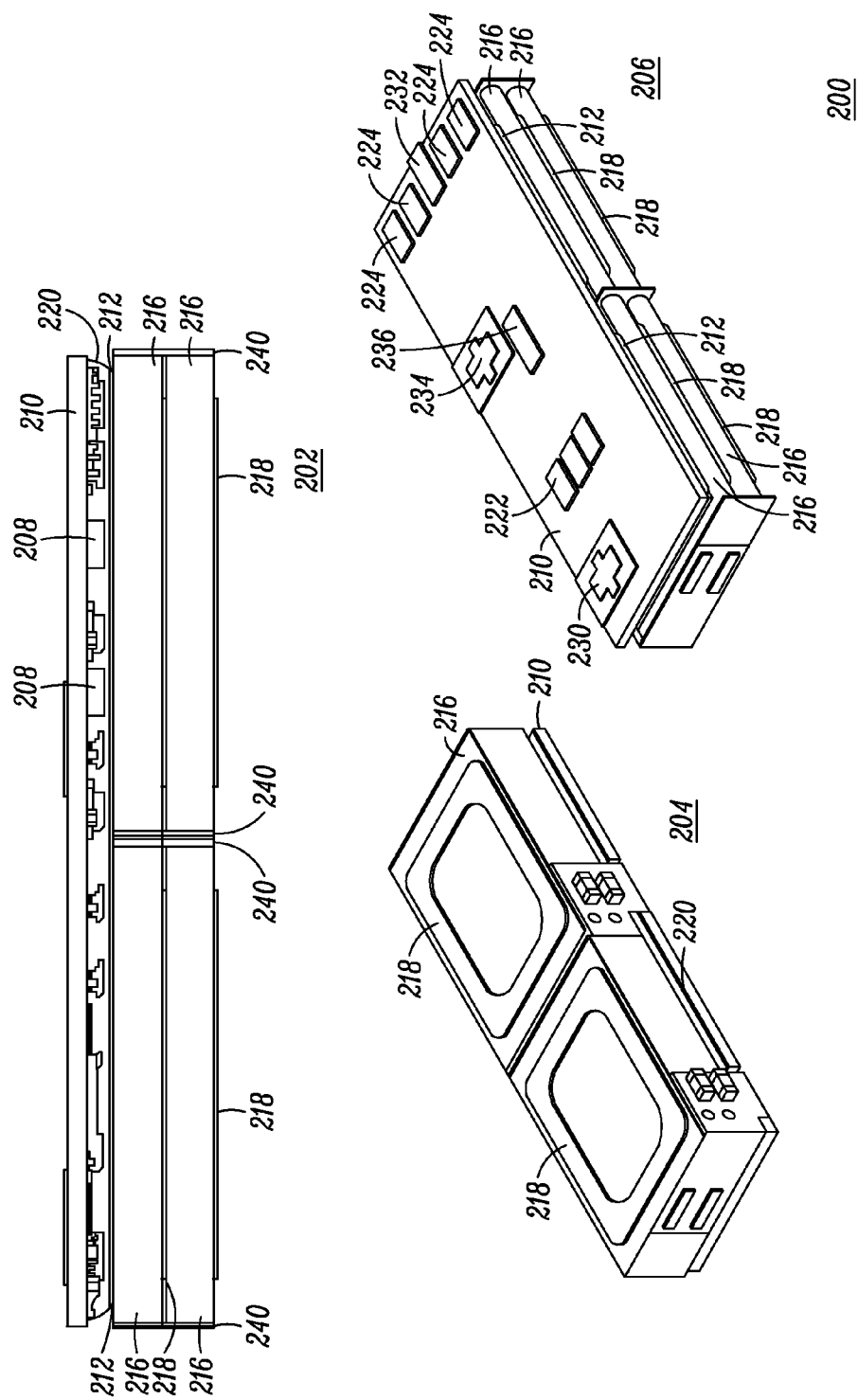
FIG. 2 illustrates various views of a battery pack formed in accordance with an embodiment of the invention.

FIG. 2 shows an intrinsically safe battery pack assembly 200 formed in accordance with an embodiment of the invention. The battery pack 200 is shown in a cross sectional side view 202, a first perspective view 204, and a second perspective view 206. While shown with four cell packs, the battery pack assembly 200 applies to 1, 2, 3, . . . to n cell pack arrangements in parallel and series arrangements or any combination of parallel/series connections (and independent of cell thickness or footprint). In accordance with the embodiment, a printed circuit board (PCB) 210 with a plurality of components disposed thereon is oriented to face downwards towards a cell stack formed of a plurality of battery cells 216. The battery cells 216 can comprise one or more chargeable cells such as Lithium ion, Nickel Metal Hydride, Nickel Cadmium, or the like. The PCB 210 is formed of standard printed circuit board material, such as FR-4, halogen free PCB, or the like. The circuitry 208 is disposed on a top surface of PCB 210 and comprises electrical components which electrically couple to the cells 216. In accordance with the embodiment, all the components 208 are disposed on a single surface that being the top surface of PCB 210, while interface contacts are coupled to the bottom surface of the PCB. In accordance with the embodiment, the plurality of components 208 are covered with a low pressure mold (LPM) encapsulation 220. The LPM encapsulation 220 is formed of a polyamide material injection molded over the component side of the PCB 210. Polyamide material provides good thermal stability and excellent mechanical properties making it a highly advantageous material to for the intrinsically safe battery pack 200. Other suitable LPM materials, such as polyolefin may alternatively be used.

In accordance with the embodiment, the LPM encapsulation 220 is formed at a predetermined height substantially equal to the tallest component of the PCB 210. The PCB 210 surface covered with the LPM encapsulation 220 is seated upon spacers 212 which are coupled to the cell stack 216. Additional spacers 218 are located between adjacent cells within the stack. View 204 shows spacers 218 located at the bottom of the cell stack 216. The spacers 212, 218 may be formed of double sided temperature resistive tape. For example, the spacers 212, 218 can be formed of double sided acrylic based pressure sensitive adhesive material thereby providing adhesive spacers.

View 204 is a perspective view of the battery pack 200 flipped over showing spacers 218 coupled to cells 216. Not only are the flex and insulator components of FIG. 1 eliminated, but radio contacts 222, providing a radio-to-battery interface, and charger contacts 224, providing a radio-to-charger interface, are now coupled directly to a bottom surface of PCB 210 as shown in view 206. Thus, the radio contacts 222 and charger contacts 224 have a shorter interconnect path (directly through the PCB 210) to components 208, without having to run interconnections through a connector, such as the connector 124 of FIG. 1. Cell connections are made at a negative cell contact 230, a positive cell contact 232, and mid cell contacts 234, 236. Mid-cell contact 234 is coupled through an aperture 236 of the PCB 210, connecting through the bottom and top surfaces.

The only insulators utilized in battery pack 200 are located on the side of the cells 240. These insulators can be any solid material that is greater than 0.5 mm thick to meet the IECEx spacing requirements for separation of conductors and must have a minimum dielectric strength of 500V rms. The relevant standard is IECEx 60079-11.

In accordance with the embodiment, the LPM encapsulation 220 is formed to have a minimum tolerance thickness equivalent to the height as the tallest component 208 on the PCB 210. As a result, under nominal conditions a thin layer of LPM material 220 is injection molded above the component such that it may actually touch the component. The height is selected to be equal to the height of the component, as variations based on processing and tooling tolerances of LPM are considered acceptable. Even with the LPM encapsulation 220 being molded to the height of the tallest component the LPM encapsulation provides sufficient tolerance over a variety of temperature conditions to meet ATEX standards.

The battery pack assembly 200 provides several advantages over the assembly 100 of FIG. 1 in that the flex 120 and its associated flex insulation 140 are no longer required, the cell stack is no longer staggered, and the connector 124 has been eliminated. The battery pack 200 thus provides a low profile assembly with fewer components than that of the prior art assembly 100.

Figure 3:
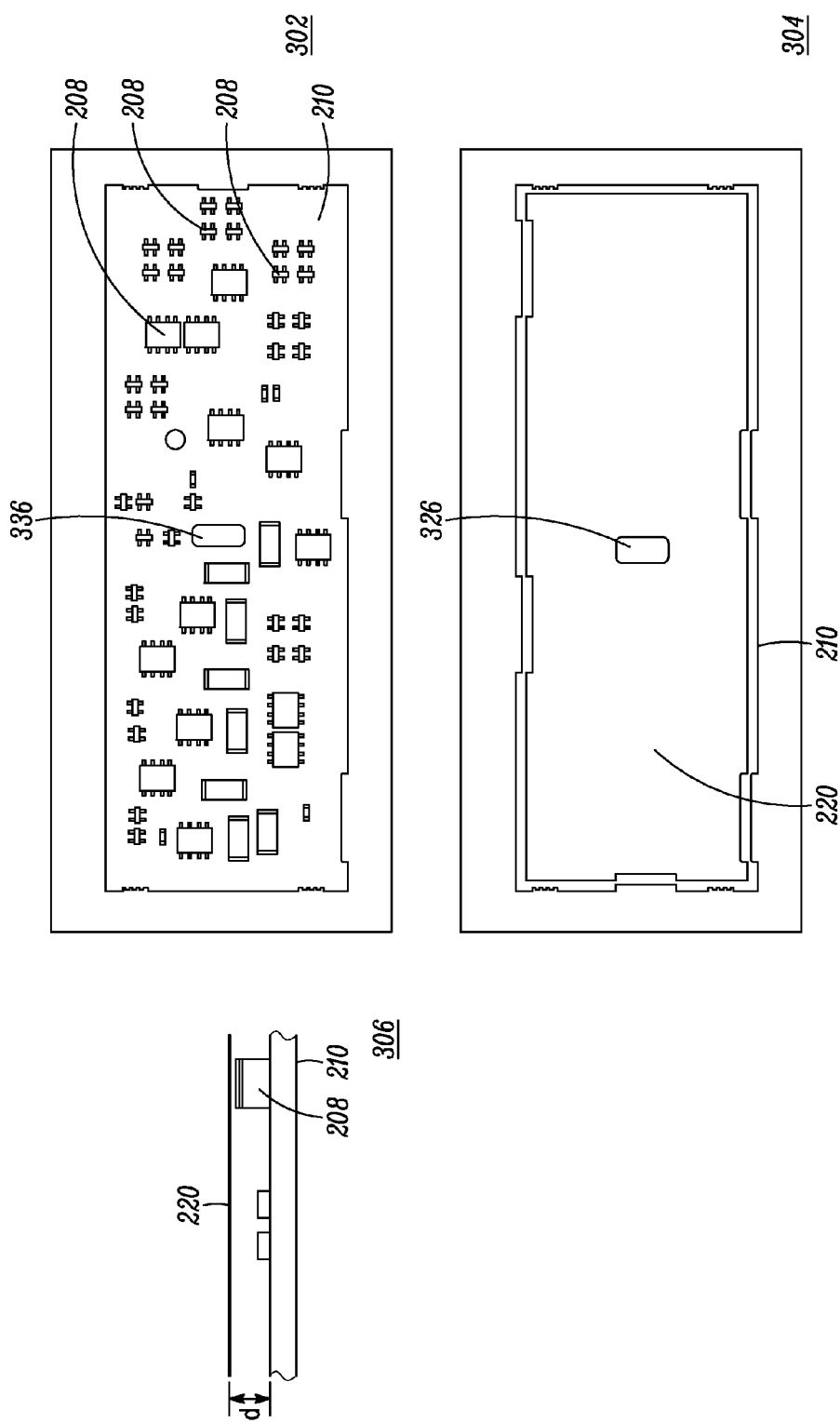
FIG. 3 illustrates a battery pack printed with and without a low pressure mold encapsulation in accordance with an embodiment of the invention.

FIG. 3 shows the PCB 210 in view 302, prior to being coated with LPM encapsulation 220, having electrical components 208 disposed thereon. View 304 shows the LPM encapsulation 220 coupled to the PCB 210. View 306 shows a cut-away side view of the PCB 210 with LPM encapsulation 220 thereon. As previously described, the LPM encapsulation 220 is formed of an injection molded polyamide material. The LPM encapsulation 220 comprises an aperture, LPM encapsulation aperture 326, which aligns with PCB aperture 336 providing thereby providing a pass through to facilitate the connection of mid cell contact 234 on the PCB 210 to the cells. PCB 210 is formed of standard printed circuit board material, such as FR4, halogen free PCB, or the like.

Cut-away side view 306 shows the LPM encapsulation 220 touching the tallest component of components 208 disposed on PCB 210. As an example, for a lithium ion type cell back, with a PCB 210 of four infallibly spaced layers, the distance "d" between LPM encapsulation 220 and the PCB 210 may be approximately 2.5 mm. Utilizing the assembly and technique in accordance with the embodiment eliminates two insulator thicknesses and a flex thereby advantageously achieving a profile reduction of 1.2 mm. While different cell capacities and cell technologies will impact overall size, the elimination of two insulator thicknesses and a flex reduces parts count and cost, while providing a slimmer profile assembly that maintains safety standards.

While the intrinsically safe battery pack assembly 200 advantageously allows components 208 to be disposed on a single surface (top surface) of the PCB 210, the configuration does not prevent and can accommodate additional components on the other (bottom) side, if so desired.

Figure 4:
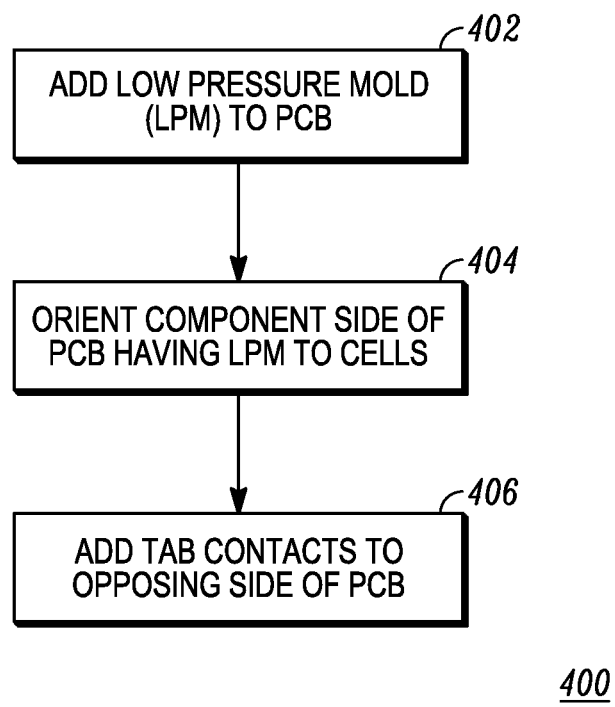
FIG. 4 is a flowchart of a method for assembling the battery pack in accordance with an embodiment of the invention.

FIG. 4 is a flowchart of a method 400 for assembling a battery pack in accordance with the embodiment. Method 400 begins at 402 by adding a low pressure mold (LPM) encapsulation over the component side of a printed circuit board (PCB) specified to the height of the tallest IC. The LPM encapsulation may be formed in accordance with materials and processes previously discussed in conjunction with FIGS. 2 and 3. At 404, the component side of the PCB is oriented toward the cells and seated upon a spacer. The LPM encapsulation is assembled to the cells via the spacers. Contact tabs, for charger and radio contacts, are then added, such as by welding or assembling, at 406 to the non-component side of the PCB.

Accordingly, there has been provided an intrinsically safe battery pack in which PCB insulators, flex insulators, flex, and flex connector have been eliminated. The battery pack provided by the various embodiments provides a lower profile with reduced parts count and reduced cost. These lower profile battery packs are particularly advantageous for products operating in the public safety communications environment, where the product is designed to accommodate cell swell due to the ruggedized environments and higher power requirements. The battery pack formed in accordance with the embodiment is highly beneficial to two-way radio batteries where multiple electrical connections are required to the charger, radio contacts, and battery cells while also insulating the electrical parts from the battery cell bodies.

Thus, products needing to comply with environmental standards such as ATEX can benefit from the assembly formed in accordance with the embodiment.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

The invention claimed is:

1. A battery pack, comprising:
a plurality of battery cells;
a printed circuit board (PCB) having top and bottom surfaces;
electrical components disposed on the top surface of the PCB;
a plurality of charger interface contacts and radio interface contacts disposed on the bottom surface of the PCB;
a low pressure mold (LPM) encapsulation formed only over the top side of the PCB, the LPM encapsulation covering the electrical components at a predetermined height that covers the tallest electrical component;
the top surface of the PCB having the electrical components and LPM encapsulation being oriented to face the plurality of battery cells within the battery pack;
spacers coupled to the cell stack; and
wherein the PCB surface covered with the LPM encapsulation is seated upon the spacers.

2. The battery pack of claim 1, further comprising:
an insulator disposed between the LPM and the plurality of battery cells.

3. The battery pack of claim 1, wherein the PCB comprises components disposed upon a single surface, the single surface being the top surface.

4. The battery pack of claim 1, further comprising components disposed upon both bottom and top surfaces of the PCB.

5. The battery pack of claim 1, wherein the LPM encapsulation is injection molded over the top surface of the PCB.

6. The battery pack of claim 1, wherein the LPM encapsulation is formed of a polyamide material.

7. The battery pack of claim 1, wherein PCB and the LPM encapsulation have apertures formed there through to provide a pass through for mating the electrical components to the plurality of battery cells.

8. The battery pack of claim 1, wherein the battery pack is formed without a flex, a flex connector, a flex insulator, and a PCB insulator.

9. The battery pack of claim 1, wherein the battery pack provides ATEX compliance with public safety communication products.

10. A battery pack, comprising:
a battery cell;
a printed circuit board (PCB) having top and bottom surfaces;
electrical components disposed on the top surface of the PCB;
interface contacts disposed on the bottom surface of the PCB, the interface contacts electrically coupling to the electrical components and the battery cell;
a low pressure mold (LPM) encapsulation formed only over the top side of the PCB, the LPM encapsulation covering the electrical components at a predetermined height that covers the tallest electrical component;
the top surface of the PCB having the electrical components disposed thereon and LPM encapsulation being oriented to the battery cell;
spacers coupled to the cell stack; and
wherein the PCB surface coated with the LPM encapsulation is seated upon the spacers.

11. The battery pack of claim 10, further comprising:
an insulator coupled between the LPM encapsulation and the battery cell.

12. The battery pack of claim 11, wherein the insulator is adhesively coupled between the LPM encapsulation and the battery cell.

13. The battery pack of claim 10, wherein the interface contacts comprise:
   radio and charger interface contacts disposed on the bottom surface of the PCB.

14. The battery pack of claim 10, wherein the battery pack operates with ATEX compliant communication products.

15. The battery pack of claim 10, wherein the LPM encapsulation is either a polyamide material or a polyolefin material.

16. A method for forming a battery pack, the method comprising:
   disposing a plurality of electrical components on a top side of a printed circuit board (PCB), thereby forming a component side;
   coating only the component side of the PCB with a low pressure molded (LPM) encapsulation, the LPM encapsulation covering the electrical components at a predetermined height that covers the tallest electrical component on the PCB;
   providing a cell stack having at least one battery cell; and
   orienting and coupling the top surface of the PCB having the plurality of electrical components and the LPM encapsulation to face cell stack;
   coupling spacers to the cell stack; and
   seating the PCB surface coated with the LPM encapsulation upon the spacers.

17. The method of claim 16, further comprising disposing charger interface contacts and radio interface contacts on a bottom side of the PCB.

18. The method of claim 16, further comprising coupling the LPM encapsulation to the cell stack using an adhesive spacer.

19. The method of claim 16, wherein LPM is coated to the PCB using injection molding.

20. The method of claim 16, wherein the battery pack is formed without a flex, a flex connector, a flex insulator, and a PCB insulator.

* * * * *